United States Patent
Hutchinson et al.

(10) Patent No.: US 11,528,412 B2
(45) Date of Patent: Dec. 13, 2022

(54) APPARATUS AND METHOD FOR STITCHING TOGETHER MULTIPLE IMAGES

(71) Applicant: Avago Technologies International Sales Pte. Limited, Singapore (SG)

(72) Inventors: James Andrew Hutchinson, Cambridge (GB); Thomas Oscar Miller, Cambridge (GB); Stephen John Barlow, Cambridge (GB); Jack Stuart Haughton, Cambridge (GB)

(73) Assignee: Avago Technologies International Sales Pte. Limited, Singapore (SG)

( * ) Notice: Subject to any disclaimer, the term of this patent is extended or adjusted under 35 U.S.C. 154(b) by 258 days.

(21) Appl. No.: 16/625,590

(22) PCT Filed: Jun. 21, 2018

(86) PCT No.: PCT/GB2018/051739
§ 371 (c)(1),
(2) Date: Dec. 20, 2019

(87) PCT Pub. No.: WO2018/234817
PCT Pub. Date: Dec. 27, 2018

(65) Prior Publication Data
US 2021/0152737 A1  May 20, 2021

(30) Foreign Application Priority Data
Jun. 22, 2017 (GB) ...................... 1710019

(51) Int. Cl.
*H04N 5/225* (2006.01)
*H04N 5/232* (2006.01)
(Continued)

(52) U.S. Cl.
CPC ....... *H04N 5/23229* (2013.01); *G06T 3/0062* (2013.01); *G06T 7/11* (2017.01);
(Continued)

(58) Field of Classification Search
CPC .............. H04N 5/23229; H04N 9/3179; G06T 3/0062; G06T 7/11; G06T 7/174;
(Continued)

(56) References Cited

U.S. PATENT DOCUMENTS 6,677,981 B1    1/2004  Mancuso et al.
2012/0293609 A1  11/2012  Doepke et al.
(Continued)

FOREIGN PATENT DOCUMENTS

WO   WO 2010/025309 A1   3/2010
WO   WO 2017/182789 A1  10/2017
WO   WO 2017/182790 A1  10/2017

OTHER PUBLICATIONS

International Search Report and Written Opinion for corresponding PCT Appl No. PCT/GB2018/051739, dated Sep. 9, 2018 (15 pages).
(Continued)

*Primary Examiner* — Kelly L Jerabek
(74) *Attorney, Agent, or Firm* — BakerHostetler

(57) ABSTRACT

An apparatus for stitching together multiple camera images to form a blended image having an output projection format. The apparatus is configured to convert each of the multiple camera images into the output projection format. It is configured to stitch together the converted images to form a single image. It is also configured to output the single image as the blended image having the output projection format.

20 Claims, 7 Drawing Sheets

(51) Int. Cl.
    *G06T 7/11*     (2017.01)
    *G06T 7/174*     (2017.01)
    *G06T 3/00*     (2006.01)
    *H04N 9/31*     (2006.01)

(52) U.S. Cl.
    CPC .......... *G06T 7/174* (2017.01); *H04N 9/3179* (2013.01); *G06T 2207/20221* (2013.01)

(58) Field of Classification Search
    CPC ............... G06T 3/4038; G06T 3/00; G06T 2207/20221; G06T 11/60
    See application file for complete search history.

(56) References Cited

U.S. PATENT DOCUMENTS

| | | | |
|---|---|---|---|
| 2016/0094859 A1* | 3/2016 | Tourapis | H04N 19/865 348/43 |
| 2016/0292821 A1 | 10/2016 | Cho et al. | |
| 2017/0019595 A1 | 1/2017 | Chen et al. | |
| 2018/0167634 A1* | 6/2018 | Salmimaa | H04N 19/167 |
| 2018/0240276 A1* | 8/2018 | He | G06T 3/0087 |
| 2018/0322611 A1* | 11/2018 | Bang | G06T 3/0037 |
| 2019/0385277 A1* | 12/2019 | Hutchinson | G06T 7/33 |

OTHER PUBLICATIONS

Search Report for corresponding GB Appl No. 1710019.9, dated Nov. 26, 2018.
Aziz et al., "Video-rate Panorama for Free-viewpoint TV," 2016 13th Conference on Computer and Robot Vision (CRV), IEEE, Jun. 2016, pp. 228-235.
Matthew Brown et al., "Automatic Panoramic Image Stitching using Invariant Features", International Journal of Computer Vision, vol. 74, No. 1, Apr. 26, 2007, pp. 59-73.
Wei Xu at al., "Panoramic video stitching from commodity HDTV cameras", Multimedia Systems, vol. 19, No. 5, Apr. 4, 2013 (Apr. 4, 2013), pp. 407-426.
Anjali Wheeler: "Improving VR videos", YouTube Engineering and Developers Blog, Mar. 14, 2017 (Mar. 14, 2017), XP055500683, Retrieved from the Internet: URL:https://web.archive.org/web/20170314174223/https://youtube-eng.googleblog.com/2017/03/improving-vr-videos.html [retrieved on Aug. 20, 2018].
Anonymous: "Argon360: Hardware-based real time video stitching", Mar. 20, 2017 (Mar. 20, 2017), XP055499711, Retrieved from the Internet: URL:https://web.archive.org/web/20170320044816if_/http://www.argondesign.com/media/uploads/files/P8008-M-016a_Argon_360_flyer_3gcpJ48.pdf [retrieved on Aug. 14, 2018].

* cited by examiner

APPARATUS AND METHOD FOR STITCHING TOGETHER MULTIPLE IMAGES

CROSS-REFERENCE TO RELATED APPLICATIONS

This application is a national stage of and claims priority under 35 U.S.C. § 371 to PCT Application No. PCT/GB2018/051739, filed on Jun. 21, 2018, which claims priority to GB Application No. 1710019.9, filed on Jun. 22, 2017. The contents of both of these priority applications are hereby incorporated by reference in their entirety.

This invention relates to an apparatus and method for processing images.

A "normal" camera lens is one that produces images that generally look natural to the human eye because there is no significant expansion or contraction distorting the perspective. Special lenses—such as fish-eye lenses—can be used to generate images with very wide angles of view. Typically, the perspective in these images will look distorted to the human observer. Some cameras may use multiple lenses, or a mechanism for moving a single lens between different imaging positions, to generate a wide-angle image. Multiple camera images can be stitched together to form a single image having a wider field of view that any of the lenses generate individually. It is possible to stitch together enough images to create a 360° image.

UK Patent Application Number 1606746.4, the contents of which are incorporated herein by reference, describes a transform and filter bloc that converts camera images into an intermediate cube-map representation before stitching them together. In the intermediate cube-map representation, the incoming images are projected into six separate image planes, one for each face of a cube. The stitching of the images can then be performed on each face independently, before the blended image is transformed into a selected output projection. This technique requires the intermediate cube-map representations to be stored, together with the stitched version of those intermediate cube-map representations.

According to a first aspect, there is provided an apparatus for stitching together multiple camera images to form a blended image having an output projection format. The apparatus is configured to convert each of the multiple camera images into the output projection format, stitch together the converted images to form a single image and output the single image as the blended image having the output projection format.

Other aspects may include one or more of the following:

The apparatus may be configured to convert each of the multiple camera images into the output projection format via an intermediate projection format.

The apparatus may be configured to store a look-up table that identifies, for one or more locations in the camera image, a corresponding location in the intermediate projection format.

The apparatus may be configured to identify a location in the camera image that corresponds to a location in the converted image.

The apparatus may be configured to form a pixel for the location in the converted image in dependence on one or more pixels that are at the location identified in the camera image.

The apparatus may be configured to identify the location in the camera image by identifying a location in the intermediate projection format that corresponds to the location in the converted image and converting the identified location in the intermediate projection format into the location in the camera image.

The apparatus may be configured to convert the identified location in the intermediate projection format into the location in the camera image using the look-up table. The intermediate projection format may be a cube map representation.

An apparatus as claimed in any preceding claim, wherein the apparatus is configured to identify, for a location in the converted image, whether that location corresponds to one or more pixels that are present at a corresponding location in a camera image.

The apparatus may be configured to, for a location in the converted image that is identified as corresponding to one or more pixels that are not present in the camera image, skip converting the camera image into the output projection format in respect of that identified location.

The apparatus may be configured to identify whether one or more pixels are present in dependence on a distance between the corresponding location in the camera image and an edge of that camera image.

The apparatus may be configured to store a look-up table that identifies, for one or more locations in the camera image, a distance between each of those locations and an edge of the camera image.

The output projection format may be selectable by a user. The output projection format may be one of an equirectangular, cylindrical or rectilinear output projection format.

An apparatus as claimed in any preceding claim, wherein the blended image having the output projection format may be spherical.

According to a second aspect, there is provided a method for stitching together multiple camera images to form a blended image having an output projection format.

The method comprises converting each of the multiple camera images into the output projection format, stitching together the converted images to form a single image and outputting the single image as the blended image having the output projection format.

The present invention will now be described by way of example with reference to the accompanying drawings. In the drawings.

Figure 1:
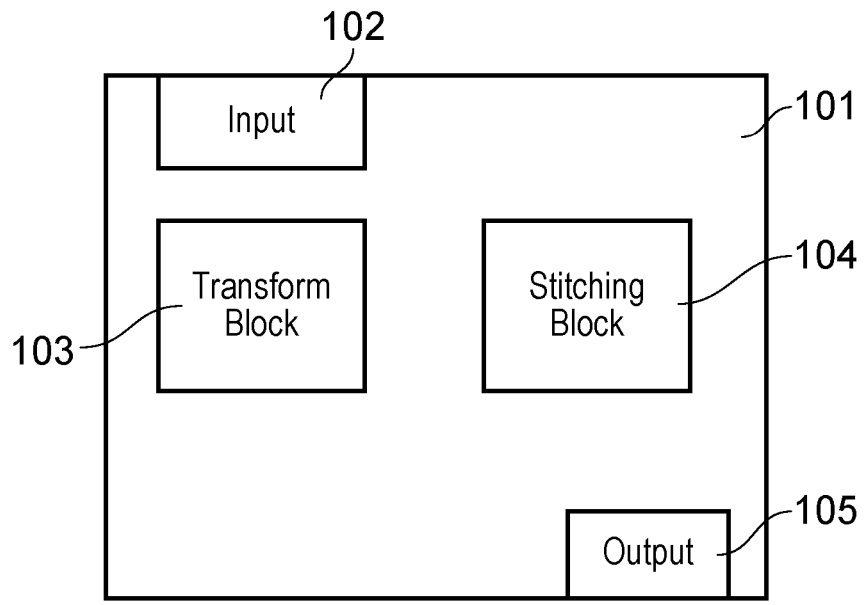
FIG. 1 shows an example of an image processing apparatus.

An example of an image processing apparatus is shown in FIG. 1. The apparatus is shown generally at 101. It comprises an input 102 that is configured to receive multiple camera images, which the apparatus will stitch together to form a blended image having an output projection format. It comprises a transform block 103 that is configured to convert each of the multiple camera images into the output projection format. It also comprises a stitching block 104 that is configured to stitch together multiple camera images to form a blended image having the output projection format. The apparatus finally comprises an output 105 that is configured to output the single image as the blended image having the output projection format.

The single image may be output to a user, without further processing being required. The output projection format is therefore preferably one that is comprehensible to a human. It could be termed a "presentation format". The output projection format is thus distinguished from an intermediate projection format, which is not intended for presentation to a user but will instead undergo further processing or transformation before being output in its final format. The output projection format may be selectable from different options. Those options may include equirectangular, cylindrical, rectilinear etc. The transform block 103 may be configured to convert the camera images into the output projection format via an intermediate projection format. A suitable intermediate projection format could, for example, be a cube map representation.

Stitching together images that have already been converted into the output projection format may save memory bandwidth compared with implementations in which the camera images are stitched together in some intermediate projection format before the blended image is converted into the output projection format. This is because the blended image no longer needs to be stored before undergoing the further processing that will convert it into the output projection format. Instead the blended image will already be in the output projection format, which may reduce the memory requirements by around half.

Figure 2:
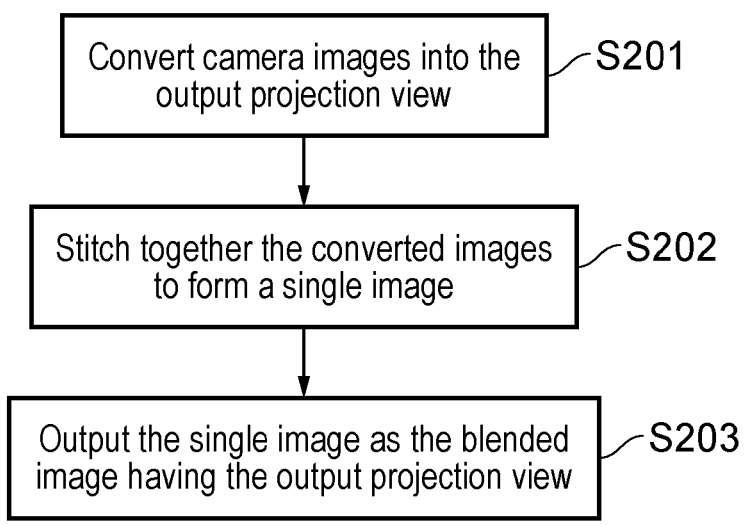
FIG. 2 shows an example of a method for processing images.

A general overview of a method for stitching together multiple camera images to form a blended image having an output projection format is shown in FIG. 2. The method commences in step S201 with converting each of the multiple camera images into the output projection format. The converted images are then stitched together to form a single image (step S202). The single image in then output as the blended image having the output projection format (step S203). More detailed examples of how these steps might be implemented can be found below.

The image that is received by the image processing apparatus will be formed from a plurality of pixels. Each pixel is likely to be represented by its own set of pixel values. It is these values that define how the pixel appears to the viewer, e.g. when displayed on a screen. The pixel values are determined by the colour model. Examples of suitable colour models include RGB and YUV. The specific examples described below make use of the YUV colour model, in which Y is the luma component (brightness) and U and V are the chroma components (colour). Each pixel value can be considered to represent a particular "channel". Another "channel" may be provided by the alpha value, which often accompanies the pixel values in the frames formed via the processes described below. The alpha values define how the frames for different images should be blended together during the pyramid sum. The chroma channels U and V are commonly downsampled by a factor of two with respect to the luma channel. This is known as YUV420. The same downsampling is applied to the alpha channel. Thus, the apparatus receives image data in the form of "quads", comprising 4 luma pixels, 2 chroma pixels and an alpha value.

The image processing apparatus shown in FIG. 1 may be part of a larger apparatus that is configured to transform and blend a set of frames from a multiple camera system to create a single stitched output. The stitching process consists of two principle steps. The first step is the transformation of input camera data into a selected output format. The transform block resamples the input camera frames to the selected output format. For example, the aim may be to create an equirectangular, cylindrical or rectilinear output frame. The resampling process is spilt into two stages. The first stage transforms from the selected output pixels to an intermediate format. In one example, this intermediate format may be an internal cube map representation of the output position. The second stage transforms this intermediate representation to camera space. The second stage may be performed using a look up table.

The image processing apparatus preferably supports equirectangular, cylindrical or rectilinear output views. Preferably, the parameters of the output view can be set via a programmatic interface. For example, the output view can have arbitrary size, focal length, zoom and 3D rotation. The apparatus may include a calculation pipeline for transforming from the selected output image type to an intermediate format. The apparatus may include, or have access to, a look up table that transforms the intermediate format to the camera space. In one example the look up table may be accessed via a position cache. The data stored in the look-up table may encode the camera geometry, lens model and any relevant distortions. The calculation pipeline can also be setup to perform the identity transformation. In this case the look up table will be used directly. This can be used to correct lens distortions or to perform a fixed transformation not otherwise provided by the transform block.

The second principle step in the stitching process is compositing the multiple camera images. First a Laplacian pyramid for each transformed frame is generated through a series of filtering, downsampling and upsampling stages. The pyramids are then blended together by a pyramid sum block using multiband blending to create the final stitched output. In the image processing apparatus described herein, this compositing of the multiple camera images occurs in the output projection format. Thus, the composited images may be output directly, rather than having to be stored first before being transformed into the output projection format.

Figure 3:
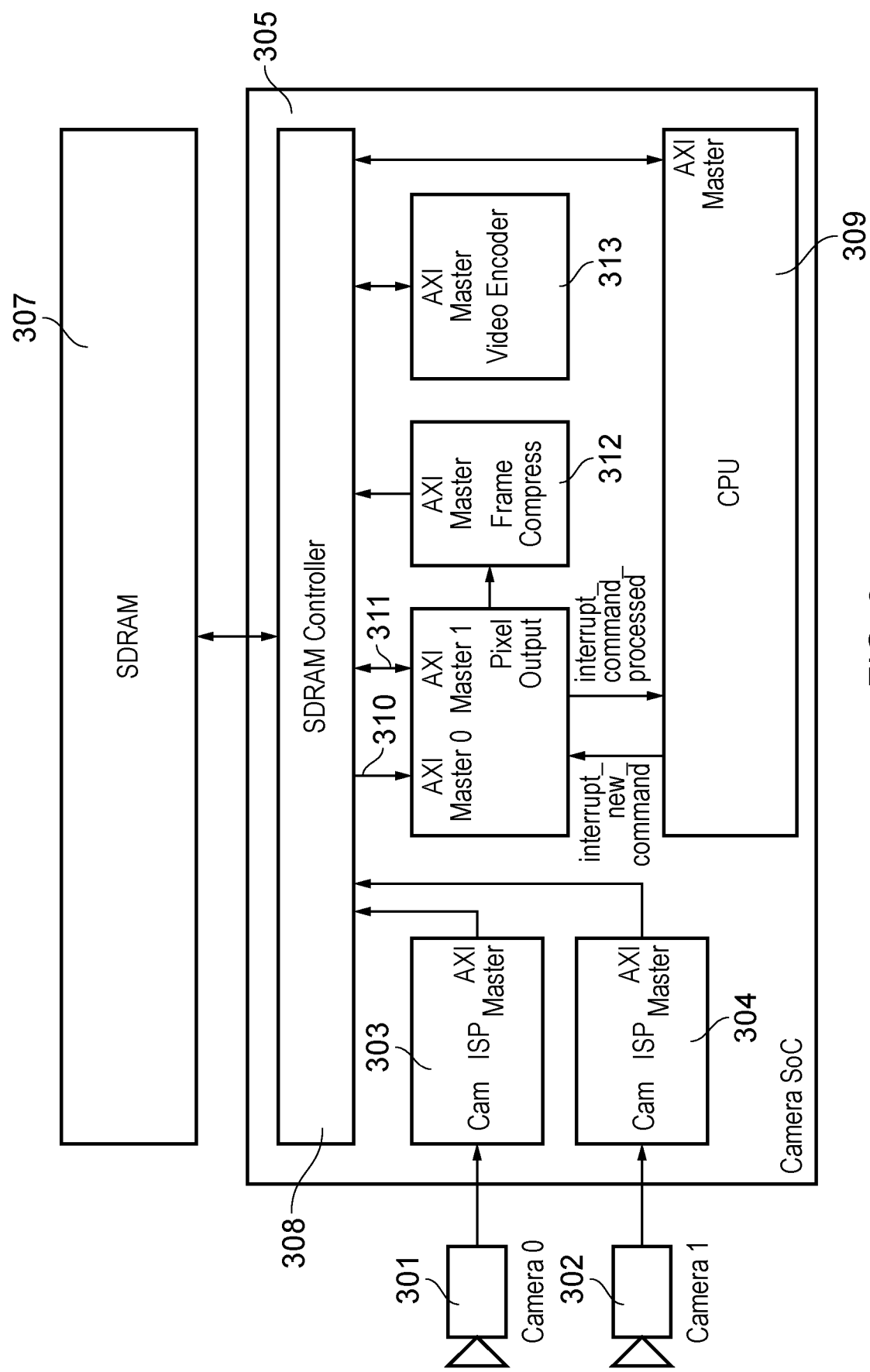
FIG. 3 shows a more detailed example of an image processing apparatus.

An example of an apparatus that is configured to transform and blend a set of camera frames to create a single stitched output is shown in FIG. 3. The apparatus is shown generally at 305. In this example, two fish-eye cameras 301, 302 are arranged back-to-back to provide a full 360° spherical view. The camera data is processed by two Instruction Set Processor (ISP) blocks 303, 304. In other implementations, these could be replaced by one ISP block that is time multiplexed between the cameras. The individual camera images are written by the ISPs to memory 307 by a memory controller 308. The image processing section 309 of the apparatus incorporates the transform block. This section is configured to operates autonomously from a command queue in memory. Commands are generated by the host Central Processing Unit (CPU) 309. The image processing section reads frames from memory over AXI Master 0 (310). Compressed transformed data is written over AXI Master 1 (311). When data from all the cameras has been processed, the compressed transformed data is re-read using AXI Master 1 and blended. The resulting stitched output is output as an AXI4 Stream on Pixel Output. This is then typically compressed by compression unit 312 into a format used by the video encoder 313 and written back to memory. In a system like this, assuming a clock rate of 600 MHz, each camera could be 5K×5K producing an output equirectangular image of 8192×4096.

A more detailed example of an image processing pipeline will now be described with reference to a system that is configured to process multiple images at a time. The image processing techniques described below are not limited to this particular implementation, however. Many of these techniques are generally applicable. One possible application of the system described below is to produce spherical video content. For example, the multiple images may be photographs taken by six individual cameras. Each camera may represent one face of a cube. The pipeline's role is to stitch together groups of six images to output a video stream of spherical images. This is done by first transforming the camera images.

The Image Processing Pipeline

Figure 4:
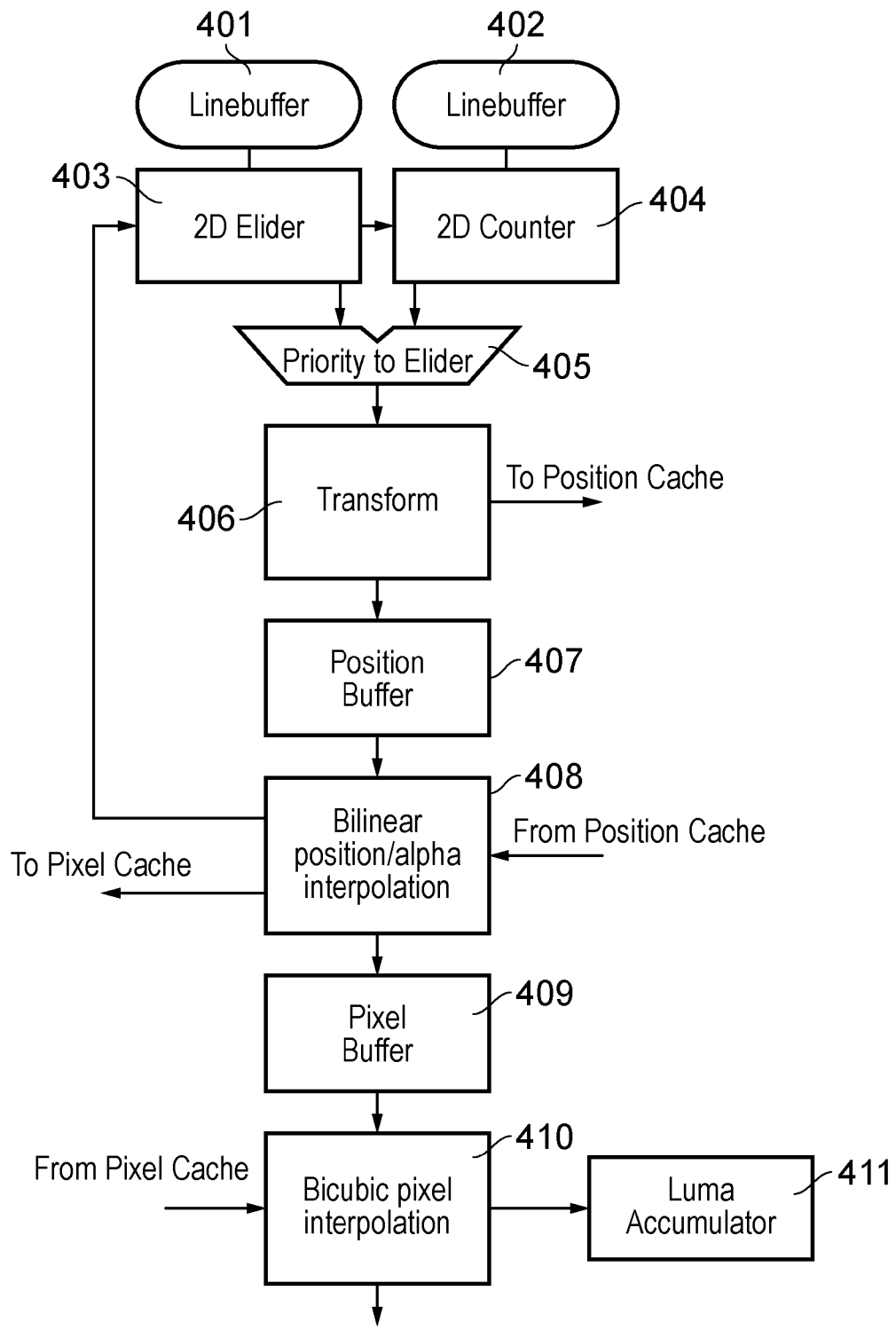
FIG. 4 shows an example of an image processing pipeline.

An example of an image processing pipeline is shown in FIG. 4. The pipeline is configured to iterate over every pixel in the output frame to calculate a source position at which to sample the camera data. Essentially the pipeline identifies locations in the camera images that will correspond to locations in the transformed images. The pipeline can thus be considered an example of transform block 103 in FIG. 1.

The calculation is broken into two parts. In the first part, a calculation pipeline maps from the output frame space into an intermediate representation. The first part of the calculation is controllable via registers. It can be updated on a per frame basis. This allows change of projection mode, frame dimensions, focal lengths, rotations etc. The intermediate format is a cube map representation of the source image. In the second part, a lookup table maps the intermediate representation into camera space. The second part of the calculation is performed using a lookup table. The lookup table encodes the information about lens calibration and relative camera geometry. The transform pipeline may process 2×2 pixels every cycle, which achieves a good throughput.

It is expected that each camera will only cover a portion of the output frame. For this reason, the image processing pipeline calculates which areas are empty and skips them. The image processing pipeline first elides areas of the output frame that are not covered by the source image. This is performed by an "elider" 403. Essentially the elider checks whether a pixel in the output frame maps to a source position in which there are pixels present.

The elider 403 identifies whether regions of pixels can be considered "present" or "not present" by looking at representative pixel samples in each region. In particular, the elider may look at the alpha values, which represent the distance between a particular location of a pixel in a camera image and an edge of that image. The pixel regions are termed "squares" herein. This term is particularly relevant to an example in which the pixel regions are of equal width and height (e.g. they may be 64×64 squares). The term "square" is not intended to be interpreted in a strictly literal fashion, however; it should be understood that the teachings herein can be applied to pixel regions of any size or shape. The elider preferably signals to the counter block 404 which squares can be skipped, based on a determination that those squares are "not present". The counter block iterates over every quad in the output image in raster order, transforming each quad into source space. When the counter enters a square that has been elided, it skips the quads in that square and moves forward to the next square. One consequence of this is that the skilled squares are not converted into the output projection format.

The dimensions of the frame that is to be iterated over by the image processing pipeline may be set in a register interface. Borders are preferably added to the area of the frame, to produce valid output from the reduce filters that will help form the Laplacian pyramid (described below). The size of this border may be 64 quads for the top and left edges of the frame and 96 quads for the bottom and right edges of the frame.

The image processing pipeline shown in FIG. 4 may be followed by a filter block that is responsible for constructing a Laplacian pyramid. Images from the Laplacian pyramid are later blended together to create the final stitched output using an alpha mask, which chooses the relative contribution that each camera makes to the output.

The image processing pipeline suitably calculates the alpha information which will be used by the pyramid block to flatten the pyramids together. An alpha value is stored for each quad. This value typically represents the minimum Euclidean distance from the resampling point and the edge of the frame. This information is stored with the position data.

Elider

The elider 403 may perform its calculation from output to source space across a 64×64 subsampled grid. If the top left, top right, bottom left and bottom right pixels of a 64×64 square have an alpha value of 0, then every quad that lies within this square can be considered not present. The elider iterates over the 64×64 grid in raster order. At each iteration, the elider requests a 2×2 region of pixels from the transform pipeline. The top left pixel of the first 2×2 request may be defined by the co-ordinates (tl_x−1, tl_y−1), where tl_x and tl_y are the coordinates of the top-left pixel of the frame after borders have been added. The elider suitably requests coordinates that correspond to a destination pixel. The transform block will later convert these into coordinates that are applicable to the camera frames.

The elider may be configured to determine that a square is present if any of its four corners are present. It then uses the present bits for each square to determine so-called "elide bits". When a response is received from the transform pipeline, the elider may determine a present bit for a pixel by identifying if the alpha value of that pixel is equal to zero. The present bits of the bottom-left and bottom-right pixels may be stored in a line buffer 401. The top-left and top-right present bits can be used with present bits from the previous row to calculate a single present bit for each square. A square is elided if none of the surrounding 3×3 squares are present. The elider may then pass the elide bits to the counter.

Counter

The counter 404 essentially determines which pixels will later be retrieved from the pixel cache. The counter iterates over every quad in the output frame in raster order. The counter will typically pass through each square multiple times. Incoming elide bits are preferably stored in a line buffer 402.

For each quad, a request is pushed into the transform pipeline if the quad is not elided. If the counter enters a region of the frame that has been elided, the counter increments by 32 quads to move to the next square. The destination coordinates are passed to the transform pipeline to be converted into source coordinates, along with a signal to indicate when 32 quads have been elided.

Priority to Elider

The elider 403 and the counter 404 perform essentially identical calculations. This means that significant parts of the pipeline can be shared. Preferably, priority is given to the elider. In FIG. 4, this is illustrated by multiplexor 405.

Transform

The transform block 406 is responsible for transforming the frames from the input cameras to a user chosen projection. It does this by calculating the source position for each request from the elider 403 or counter 404. Suitably the transform block calculates the position of the pixel that is required from the source camera frame with subpixel accuracy.

In one implementation, the block may be controlled over an AXI4-Lite register interface. It may operate on YUV420 pixels and process one quad per cycle. Suitably 4 pixels can be processed per cycle. The block may run at 600 MHz, which gives a throughput of 80 Mpixels/frame at 30 frames/second.

Figure 5:
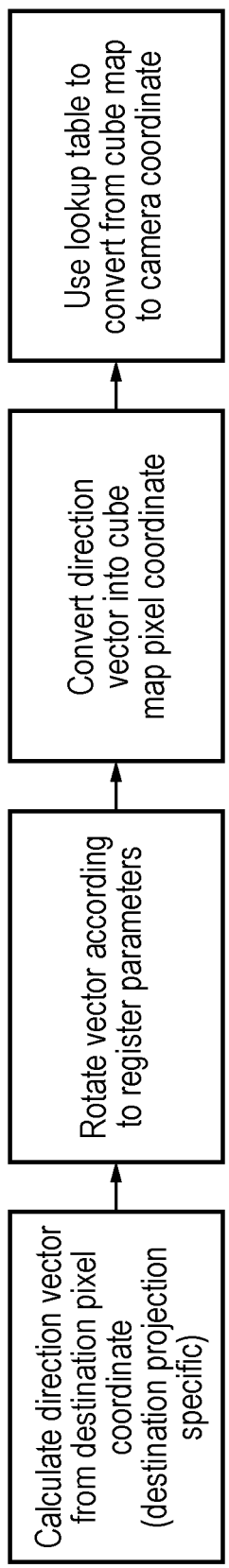
FIG. 5 shows an overview of a process for transforming camera images to an output projection format.

The transform block 406 may read the following data from registers:
- Cube face centre and dimension
- Output frame dimensions, centres, focal lengths and position of the upper left pixel
- Projection type (e.g. equirectangular, cylindrical or rectilinear)
- Rotation Matrix Using this information, it calculates the source position (i.e. camera coordinates) for every request from the elider 403 and counter 404. The calculation happens in four stages, as shown in FIG. 5.

Stage 1: Destination Pixel Coordinate Normalisation

To begin, given a destination pixel position of (X, Y) let:

$$d_x = \frac{(X - C_X^d)}{f_X^d},$$

$$d_y = \frac{(Y - C_Y^d)}{f_Y^d}.$$

$C^d$ and $f^d$ are the image centres and focal lengths of the output frame.

| Stage 2: Direction vector calculation | |
|---|---|
| Destination projection | Direction vector $\underline{v}_d$ |
| Equirectangular | $\begin{pmatrix} \cos\left(\frac{\pi d_y}{2}\right)\sin(\pi d_x) \\ -\sin\left(\frac{\pi d_y}{2}\right) \\ -\cos\left(\frac{\pi d_y}{2}\right)\cos(\pi d_x) \end{pmatrix}$ |
| Rectlinear | $\begin{pmatrix} d_x/2 \\ -d_y/2 \\ -1/2 \end{pmatrix}$ |
| Cylindrical | $\begin{pmatrix} \sin(\pi d_x) \\ -d_y \\ -\cos(\pi d_x) \end{pmatrix}$ |

Stage 3: Conversion to Cube Map Coordinates

Having calculated $\underline{v}_d$ and rotated it to obtain $\underline{v}_s$, the transform block converts into cube map co-ordinates. Each point on the sphere is projected onto an arbitrarily sized cube that surrounds it. Given a point on the surface of the sphere $v_s$ the same point on the cube can be derived by first considering what face it is located on. The face is determined by the component of $v_s$ with the greatest magnitude. If, for example $|v_s^x|>|v_s^y|$ and $|v_s^x|>|v_s^z|$, the cube face is ±X, with the sign the same as the sign of $v_s^x$.

The cube face is determined by the co-ordinate of $v_s$ with the greatest magnitude. If, for example $|v_s^x|>|v_s^y|$ and $|v_s^x|>|v_s^z|$, the cube face is ±X, with the sign the same as the sign of $v_s^x$.

A coordinate within the face, $v_f=(s_x,s_y)$ can then be determined based on the face. $s_x$ and $s_y$ are defined as follows:

| Face | $s_x$ | $s_y$ |
|---|---|---|
| +X | $v_s^y/|v_s^x|$ | $v_s^z/|v_s^x|$ |
| -X | $v_s^y/|v_s^x|$ | $v_s^z/|v_s^x|$ |
| +Y | $v_s^x/|v_s^y|$ | $v_s^z/|v_s^y|$ |
| -Y | $v_s^x/|v_s^y|$ | $v_s^z/|v_s^y|$ |
| +Z | $v_s^x/|v_s^z|$ | $v_s^y/|v_s^z|$ |
| -Z | $v_s^x/|v_s^z|$ | $v_s^y/|v_s^z|$ |

$v_f$ is normalised, where [−1, −1] is the lower-left corner of the face and [1, 1] is the upper-right corner. Note that there is no mirroring in the coordinates of $v_f$ as might be expected in a standard cube map. A scale and bias are then applied to obtain $v_t$.

$$v_t = v_f\left(\frac{d_c - 1}{2}\right) + 128$$

Where $d_c$ is the cube size. Examples of valid values for $d_c$ are 129 and 253.

Once the scaled and biased cube-face coordinate, e is known the corresponding pixel coordinate in the input frame vi can be determined by sampling a cube-map lookup table. This lookup table encodes a transform that accounts for the camera's geometry, lens characteristics and distortions. It is suitably accessed via the position cache.

The projection from the sphere to the cube, rather than using spherical coordinates, may be desirable for two reasons:
- It reduces projective distortions. The mapping is a lot closer to linear. Points that are close together in three-dimensional world space are still close together on a cube-face.
- It does not exhibit the singularities present at the pole and prime meridian. This makes sampling from a cube map much simpler and more robust than from, for example, an equirectangular map.

Stage 4: Conversion to Camera Coordinates

The source pixel position ($X_S$, $Y_S$) can be defined as:

$$X_S = d_c s_x + C^C + O_s^x$$

$$Y_S = d_c s_y + C^C + O_s^y$$

$C^C$ is the centre of the cube map. It may have the value 2048. $d_c$ is the cube map dimension, as before. $O_s^x$ and $O_s^y$ are the x and y offsets of the current face.

The transform block could be configured to calculate the source pixel positions itself. However, in a preferred implementation, the transform block is configured to access the relevant source pixel positions from a look up table. The look-up table suitably identifies one or more pixel positions in the camera images that correspond to pixel coordinates in the intermediate projection format. The look up table may be accessible to the transform block via the position cache.

The lookup table is a map from cube map coordinates to camera coordinates. Once the scaled and biased cube-face coordinate $v_t$ is known the corresponding pixel coordinate in the input frame vi may be determined by sampling the cube-map lookup table. This lookup table encodes a transform that accounts for the camera's geometry, lens characteristics and distortions. The cube map also preferably includes alpha values for each quad. It is convenient to store the alpha data in the same look-up table as the cube map and camera coordinates, although it could also be stored separately.

Figure 6:
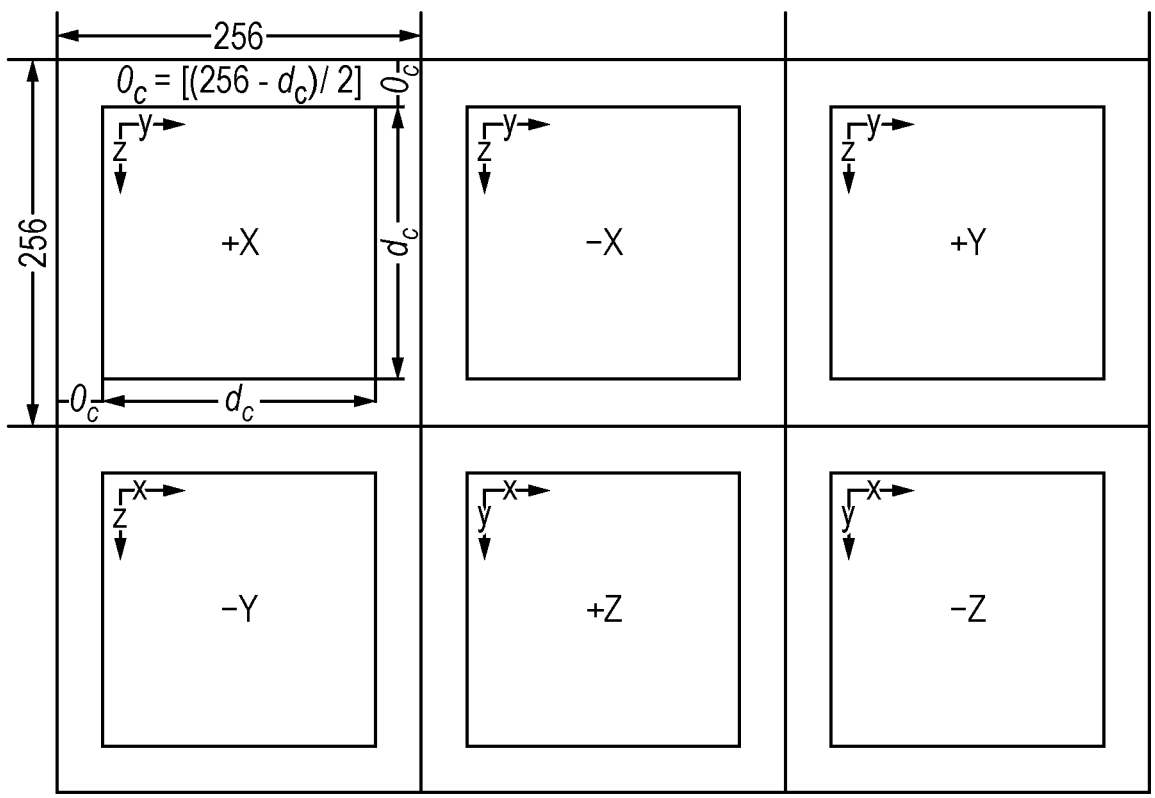
FIG. 6 shows an example of a layout of a cube map look-up table.
Figure 7:
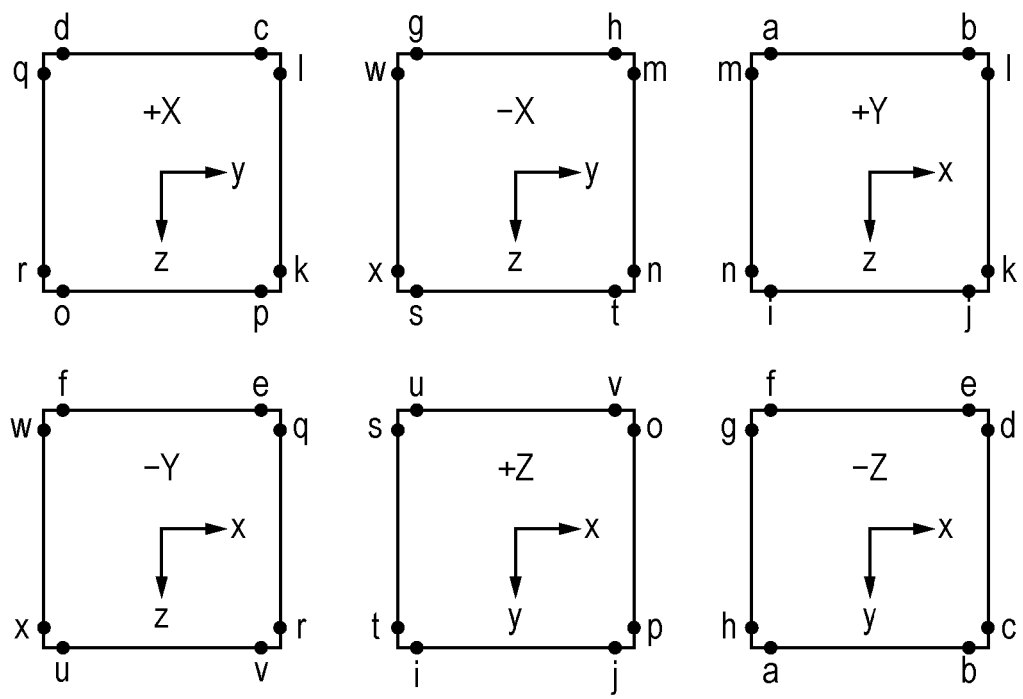
FIG. 7 shows an example of face-to-face correspondence in a cube map.

The cube map may be arranged in memory as shown in FIG. 6. The data in the table preferably includes at least a single pixel border of congruent data to ensure samples on the edge of faces can be correctly interpolated. Corresponding points on the cube map are shown in FIG. 7. Each face is a maximum of 256×256 pixels where each pixel is 64 bits wide and has the following format:

{x[26:0], y[26:0], alpha[9:0]}

Where x and y are coordinates in the relevant input image, relative to the top-left corner of that input image. In one implementation, x and y are signed 13.13 fixed point co-ordinates. The alpha value represents a distance from the x, y coordinate to the closest edge of the camera image. This value may be normalised.

Figure 8:
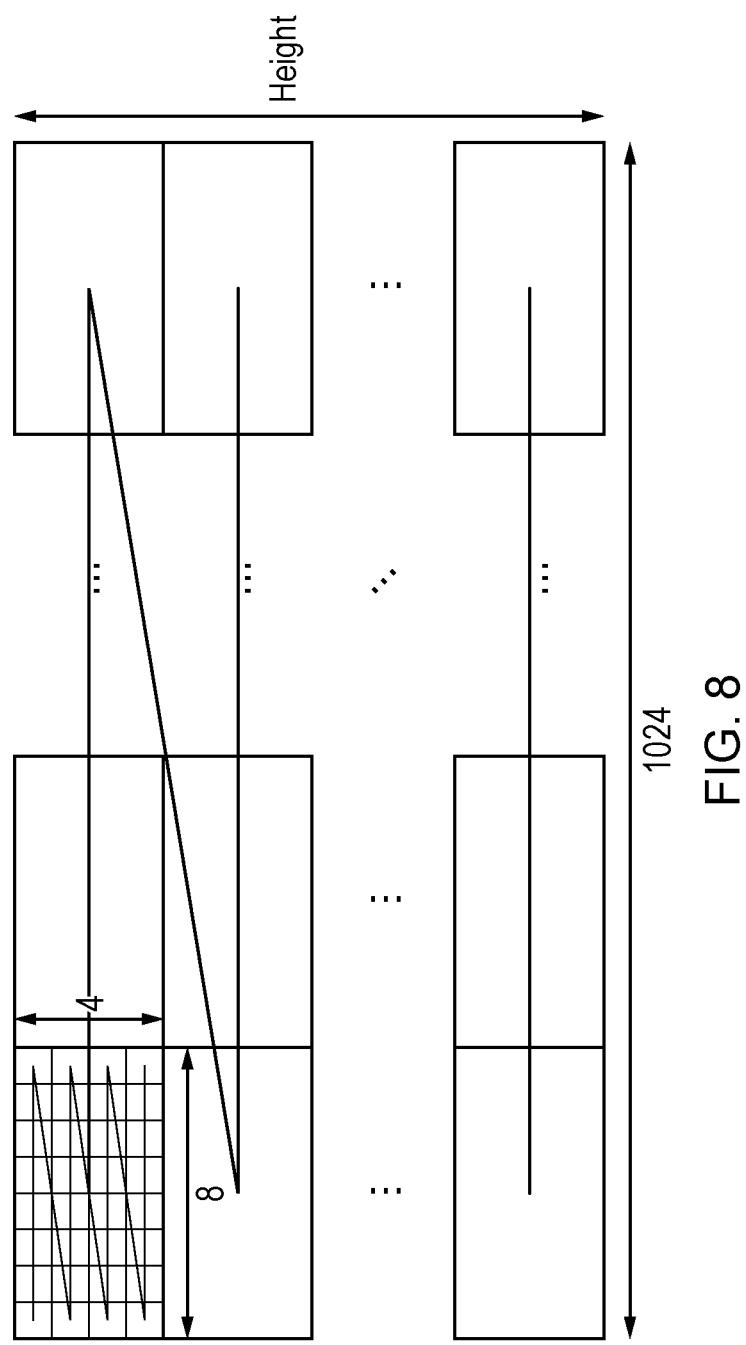
FIG. 8 shows an example of the layout of a cube map in memory.

The whole table may be stored in SDRAM in 8×4 blocks for reading by the position cache. The layout in SDRAM may be as shown in FIG. 8.

The transform block suitably makes a request of the position cache in the following format:

addr={y[9:0], x[9:0]} where x and y are the upper left coordinates of the required 2×2 block from the cube map. The position cache suitably provides the transform block with four source coordinates corresponding to the requested 2×2 block from the cube map. It also suitably provides the corresponding alpha values. For example, the position cache's response to the transform block may be packed as follows:

data={br_x[26:0],br_y[26:0],br_alpha[9:0]}
  bl_x[26:0],bl_y[26:0],bl_alpha[9:0],
  tr_x[26:0],tr_y[26:0],tr_alpha[9:0],
  tl_x[26:0],tl_y[26:0],tl_alpha[9:0], The x and y coordinates may, for example, be signed 13.13 fixed point numbers.

Position Cache

The position cache block loads and caches 8×4 blocks of position data from SDRAM. The blocks are requested over an AXI4-Stream interface. Four position data locations can be requested each cycle ((x0, y0), (x1, y1), (x2, y2), (x3, y3)). For each of these requests the block returns the 2×2 region of position data values around the position. As long all four positions are contained within a 2×2 region, the block can achieve a throughput of one request per cycle.

Position Interpolation

The first interpolation block 408 is configured to perform position interpolation and alpha interpolation following the transformation of the requested destination pixel coordinates by transform block 406.

Once the transform block 406 has obtained source coordinates $X_S$ and $Y_S$, an entry is made in position buffer 407. The entry suitably stores the fractional bits of $X_S$ and $Y_S$, along with two additional bits. For example, the format of the buffer entry may be as follows:

{S[0], E[0],
  xs[3][21:0],ys[3][21:0],
  xs[2][21:0], ys[2][21:0],
  xs[1][21:0], ys[1][21:0],
  xs[0][21:0], ys[0][21:0]}

The "S" bit may be set if the source of the request was the elider 403. The "E" bit may be set if the source of the request was the counter 404 and the next 32 quads are elided. Neither bit may be set if the source of the request was the counter 404 and the next 32 quads are not elided.

The first interpolation block is configured to read entries from the position buffer:

If the S bit is set, the four present bits are calculated by comparing the alpha values to 0. The present bits are returned to the elider 403.

If the E bit is not set, the highest 10 bits of $X_S$ and $Y_S$ are sent to the position cache. The response from the position cache is bilinearly interpolated using the fractional bits of $X_S$ and $Y_S$. A transaction using the calculated source positions is made to the pixel cache and an entry is made in the pixel buffer 409.

If the E bit is set, this is signalled in the pixel buffer entry and the transaction to the pixel cache is marked invalid. If any of the four interpolated source positions is negative, the alpha value of the quad is set to 0 and the transaction to the pixel cache is marked invalid.

Bilinear interpolation results may be rounded to 18 bits: 13 bits for the pixel cache and 5 bits for pixel interpolation. The pixel cache also expects coordinates for the UN planes. These can be calculated directly from the 18 bit intermediate results by:

$$x_{uv}=\tfrac{1}{8}(x_0+x_1+x_2+x_3),$$

$$y_{uv}=\tfrac{1}{8}(y_0+y1+y2+y3),$$

The results may be rounded to 17 bits: 12 bits for the pixel cache and 5 bits for pixel interpolation.

Alpha Interpolation

As mentioned above, each quad includes an alpha value. These values may also be interpolated by the first interpolation block 408, in a similar way to the position data. For example, the 10 bit alpha values may be bilinearly interpolated to get four 14-bit intermediate values. These values may be averaged and rounded again to give one 10-bit value for the quad. If this value is 0, the transaction to the pixel cache is suitably marked invalid.

Pixel Cache

The pixel cache block loads and caches 16×8 blocks of pixels from SDRAM. These blocks are requested over an AXI4-Stream interface. Four pixel locations can be requested each cycle ((x0, y0), (x1, y1), (x2, y2), (x3, y3)). For each of these requests the block returns the 4×4 region of luma values around the position, and the 4×4 region of chroma values around the average of these four positions. As long as all four of these positions are contained within an 8×8 region the block can achieve a throughput of one request per cycle.

This block also has an interface to an optional decompression block. This consists of two 64-bit wide AXI4-Stream interfaces. If the blocks are stored uncompressed then these interfaces should be wired together. If compression is used then the addressing scheme for the compressed blocks must be the same as the uncompressed case. The burst length for the compressed blocks will be fixed for all blocks in a frame and is set using registers.

Pixel Interpolation

The second interpolation block 410 is configured to perform pixel interpolation on the pixel values returned by the pixel cache.

The fractional bits of $X_S$ and $Y_S$ and calculated alpha value may be placed into the pixel buffer 409 to be read once the pixel values are returned from the pixel cache. The following format may be used:
{E[0],
alpha[9:0],
xuv[4:0], yuv[4:0],
x[3][4:0], y[3][4:0],
x[2][4:0], y[2][4:0],
x[1][4:0], y[1][4:0],
x[0][4:0], y[0][4:0]}

Where the E bit is set from the E bit of the position buffer.

A 4×4 separable filter is applied to the values returned from the cache. The filter values given by the following:

$$k(x) = \frac{1}{18} \begin{cases} 21|x|^3 - 36|x|^2 + 16, & |x| < 1 \\ -7|x|^3 + 36|x|^2 - 60|x| + 32, & 1 \le |x| < 2 \\ 0, & 2 \le |x| \end{cases}$$

where x is the distance from the resampled point to the filter nodes.

If $Y_i$ are the four values for one channel and x is the fractional bits that were placed in the pixel buffer) the resulting Y value is given by $$Y = Y_0 k(1+x) + Y_1 k(x) + Y_2 k(1-x) + Y_3 k(2-x).$$

The filter coefficients are stored in a fixed look up table with twelve bits of accuracy and one sign bit for each coefficient. Each row of values is filtered first to give an intermediate result for each row. The resulting five values are then filtered again to give one value for the quad.

Luma Accumulator

The luma accumulator 411 may be configured to calculate an accumulated luminance for a gain calculation, which requires the sum of the luminance values for each transformed frame. This accumulation is performed by the pipeline before the frame is filtered. The sum can be defined by:

$$L_i = \sum_{G(S)} \mu_i$$

Where $\mu_i$ are luminance values from frame i.

The number of present pixels is also recorded for each frame. These accumulated values are provided on the register interface of the block in the order frames were processed. In order to fit the accumulated luma values in a 32 bit register, the value is right shifted by 6 places.

Figure 9:
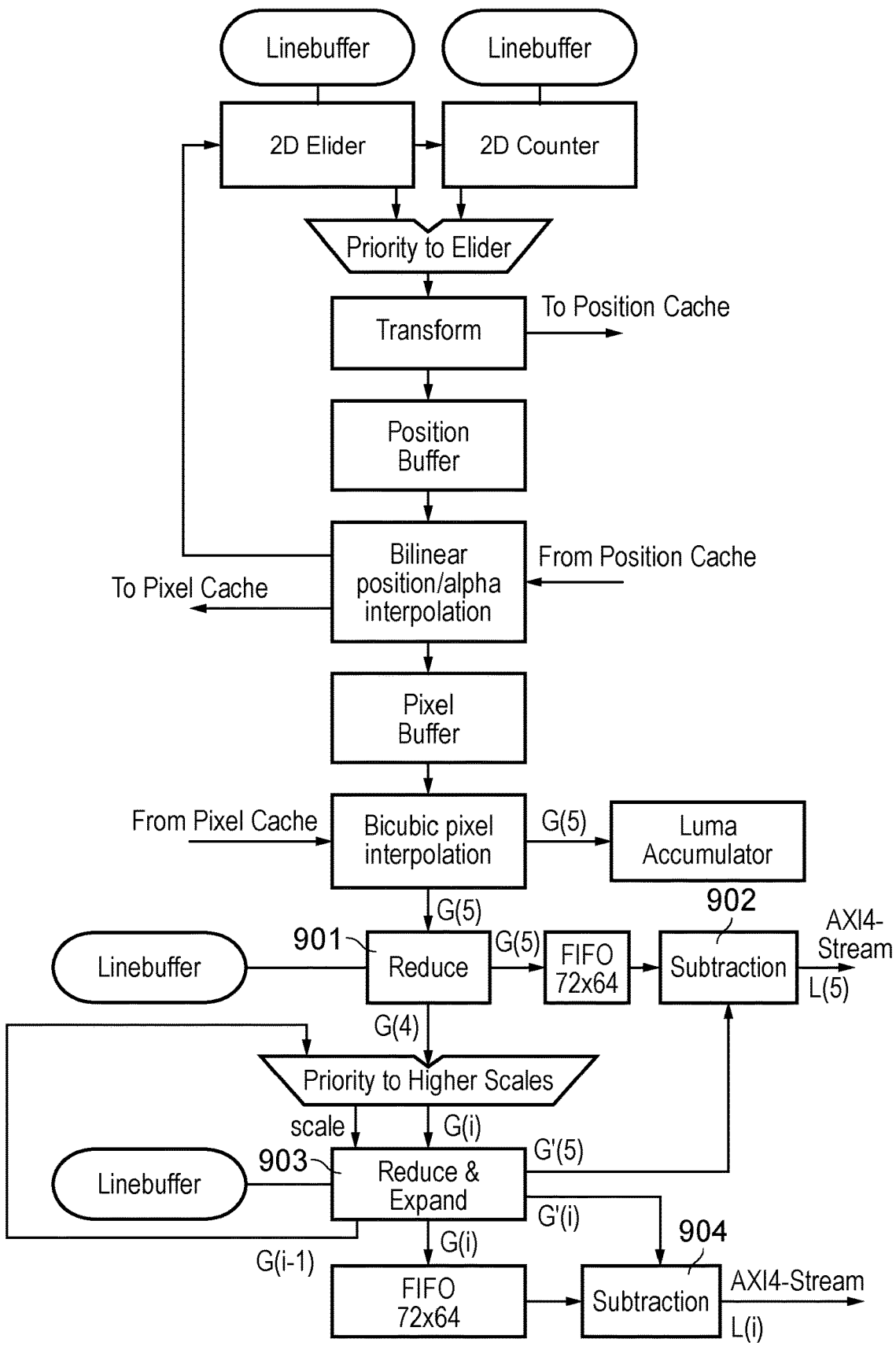
FIG. 9 shows an example of an image processing pipeline that incorporates a Laplacian generation block.

The image processing pipeline shown in FIG. 4 may be followed by a stitching block that is configured to blend the transformed images together. The process of stitching the images together typically involves multiple levels of filtering to form a pyramid of transformed images for each camera. An example of a complete image processing pipeline is shown in FIG. 9. In this example, the stitching block is implemented by a Laplacian generation block. The Laplacian generation block comprises reduce filters 901, 903, expand filters 903 and subtraction units 902, 904. The filtering process broadly comprises a downsampling performed by a reduce filter followed by an upsampling performed by an expand filter. The output of the first expand filter is subtracted from the original frame, so that only the high frequency components are preserved. This process is repeated multiple times to create the Laplacian pyramid of different frequency components.

The structures shown in the figures herein are intended to correspond to a number of functional blocks in an apparatus. This is for illustrative purposes only. The figures are not intended to define a strict division between different parts of hardware on a chip or between different programs, procedures or functions in software. In many embodiments, some or all of the procedures described herein are likely to be performed predominantly in hardware. For example, any or all of the functional blocks comprised in the image processing pipeline described above might be implemented on an integrated circuit, including an appropriately configured application specific integrated circuit (ASIC) or a field-programmable gate array (FPGA). In some implementations, some or all of the procedures described herein may be implemented by a processor acting under software control. Any such software is preferably stored on a non-transient computer readable medium, such as a memory (RAM, cache, FLASH, ROM, hard disk etc.) or other storage means (USB stick, FLASH, ROM, CD, disk etc). Any of the functional units described herein might be implemented using processing power that is accessible as part of the cloud.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An image processing apparatus comprising:
a memory that stores multiple camera images; and
a controller operatively coupled to the memory, the controller configured to:
receive the multiple camera images;
receive an output projection format;
convert each of the multiple camera images into the output projection format by:
receiving pixel coordinates of a camera image of the multiple camera images,
converting the received pixel coordinates to intermediate projection format coordinates, and
converting the intermediate projection format coordinates to source position coordinates of the output projection format; and
when each of the multiple camera images is converted to the output projection format, stitch together the converted multiple camera images to form a single image, wherein the single image comprises the output projection format.

2. An image processing apparatus as claimed in claim 1, wherein the each of the converted multiple camera images are stitched together in the output projection format.

3. An image processing apparatus as claimed in claim 1, wherein the controller is configured to identify a source location in a camera image of the multiple camera images that corresponds to a location in a converted camera image of the converted multiple camera images.

4. An image processing apparatus as claimed in claim 3, wherein the controller is configured to form a pixel for the location in the converted camera image in dependence on one or more pixels that are at the location identified in the camera image.

5. An image processing apparatus as claimed in claim 1, wherein the memory receives the multiple camera images from a multiple camera system that provides a 360-degree spherical view.

6. An image processing apparatus as claimed in claim 5, wherein:
converting the received pixel coordinates to the intermediate projection format coordinates comprises accessing a first look up table that stores one or more locations of the camera image and a corresponding location of the intermediate projection formation coordinates; and
converting the intermediate projection format coordinates to the source position coordinates of the output projection format comprises accessing a second lookup table, the second lookup table accounting for lens calibration of a camera of the multiple camera system.

7. An image processing apparatus as claimed in claim 1, further comprising an elider configured to identify, for a location in a converted image of the converted multiple camera images, whether the location corresponds to one or more pixels that are present at a corresponding location in a camera image of the multiple camera images.

8. An image processing apparatus as claimed in claim 7, wherein the elider is configured to, for a location in the converted image that is identified as corresponding to one or more pixels that are not present in the camera image, skip converting the camera image into the output projection format in respect of the identified location.

9. An image processing apparatus as claimed in claim 8, wherein the elider is configured to identify whether one or more pixels are present in dependence on a distance between the corresponding location in the camera image and an edge of that camera image.

10. An image processing apparatus as claimed in claim 8, wherein the elider identifies, for one or more locations in the camera image, a distance between each of those locations and an edge of the camera image, the identification based upon a look up table.

11. An image processing apparatus as claimed in claim 1, wherein the output projection format is selectable by a user.

12. An image processing apparatus as claimed in claim 1, wherein each of the multiple camera images are stitched together subsequent to each of the multiple camera images being converted to the output projection format.

13. An image processing apparatus as claimed in claim 1, wherein the single image comprises a blended image having the output projection format in a spherical format.

14. A method for compositing multiple camera images, the method comprising, by a processor:
receiving the multiple camera images;
receiving an output projection format;
converting each of the multiple camera images to the output projection format by:
receiving pixel coordinates of a camera image of the multiple camera images,
converting the received pixel coordinates to intermediate projection format coordinates, and
converting the intermediate projection format; and
when each of the multiple camera images is converted to the output projection format, stitching together each of the converted multiple camera images to form a single image, wherein the single image comprises the output projection format.

15. A method as recited in claim 14, wherein the processor is configured to convert each of multiple camera images by:
receiving pixel coordinates of a camera image of the multiple camera images;
converting the received pixel coordinates to intermediate projection format coordinates; and
converting the intermediate projection format coordinates to source position coordinates of the output projection format.

16. A method as recited in claim 15, wherein converting the received pixel coordinates to intermediate projection format coordinates comprises identifying, based on a look up table, a location of the received pixel coordinates of a camera image of the received multiple camera images and an edge of the camera image.

17. A method as recited in claim 14, wherein each of the multiple camera images are stitched together subsequent to each of the multiple camera images being converted to the output projection format.

18. A non-transitory computer readable medium having stored thereon computer readable instructions that, when executed at a computer system, cause the computer system to perform a method for compositing multiple camera images, the method comprising:
receiving the multiple camera images;
receiving an output projection format;
converting each of the multiple camera images into the output projection format by:
receiving pixel coordinates of a camera image of the multiple camera images,
converting the received pixel coordinates to intermediate projection format coordinates, and
converting the intermediate projection format coordinates to source position coordinates of the output projection format; and
when each of the multiple camera images is converted to the output projection format, stitching together each of the converted multiple camera images to form a single image, wherein the single image comprises the output projection format.

19. A non-transitory computer readable medium as claimed in claim 18, wherein the computer system is configured to convert each of multiple camera images by:
receiving pixel coordinates of a camera image of the multiple camera images;
converting the received pixel coordinates to intermediate projection format coordinates; and
converting the intermediate projection format coordinates to source position coordinates of the output projection format.

20. A non-transitory computer readable medium as claimed in claim 19, wherein converting the received pixel coordinates to intermediate projection format coordinates comprises identifying, based on a look up table, a location of the received pixel coordinates of a camera image of the received multiple camera images and an edge of the camera image.

* * * * *

UNITED STATES PATENT AND TRADEMARK OFFICE
CERTIFICATE OF CORRECTION

PATENT NO. : 11,528,412 B2
APPLICATION NO. : 16/625590
DATED : December 13, 2022
INVENTOR(S) : James Andrew Hutchinson et al.

It is certified that error appears in the above-identified patent and that said Letters Patent is hereby corrected as shown below:

In the Claims

Column 13, Line 61 (Claim 14): Replace "converting the intermediate projection format; and" with --converting the intermediate projection format coordinates to source position coordinates of the output projection format; and--.

Signed and Sealed this
Seventh Day of March, 2023

Katherine Kelly Vidal
*Director of the United States Patent and Trademark Office*